(No Model.)
H. LEMP.
FORMING OR SHAPING METALS BY ELECTRICITY.
No. 432,630. Patented July 22, 1890.
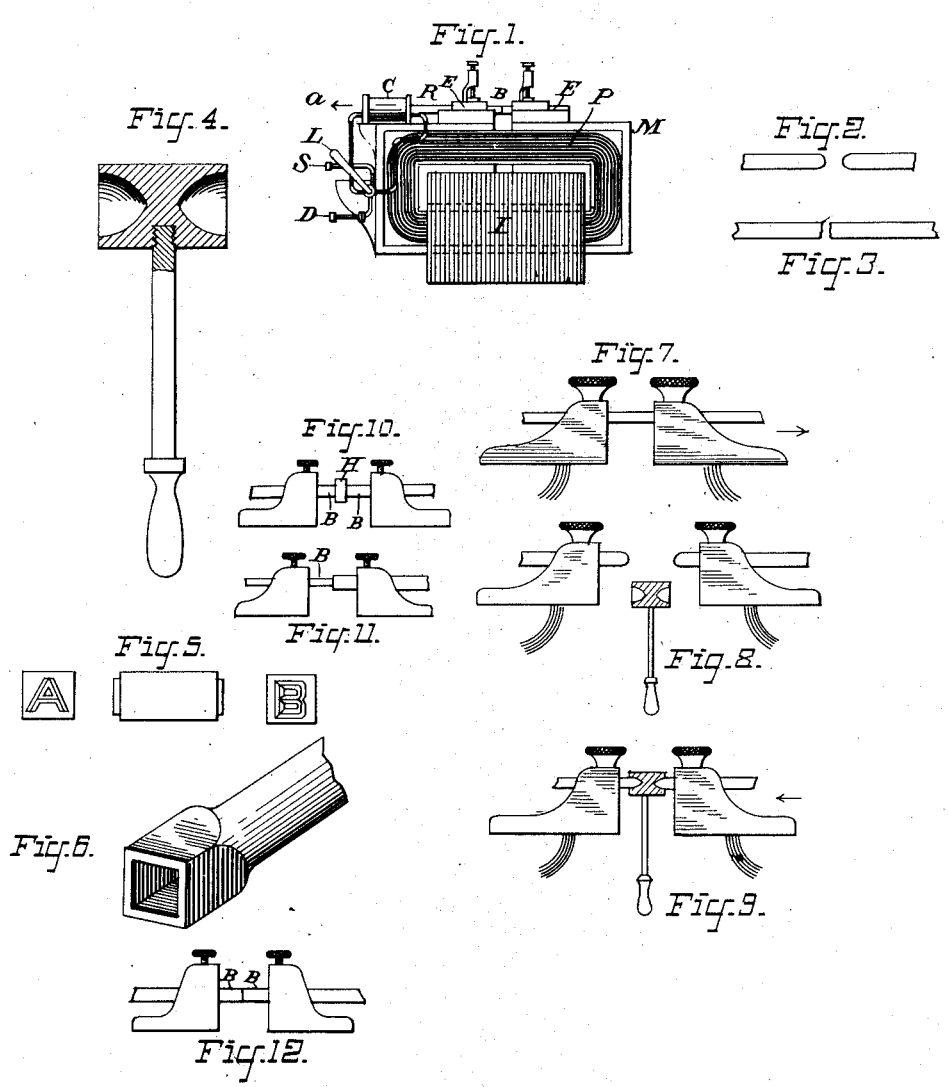
ATTEST:
INVENTOR:
Hermann Lemp

UNITED STATES PATENT OFFICE.

HERMANN LEMP, OF LYNN, MASSACHUSETTS, ASSIGNOR TO THE THOMSON ELECTRIC WELDING COMPANY, OF MAINE.

FORMING OR SHAPING METALS BY ELECTRICITY.

SPECIFICATION forming part of Letters Patent No. 432,630, dated July 22, 1890.

Application filed April 2, 1890. Serial No. 346,276. (No model.)

*To all whom it may concern:*

Be it known that I, HERMANN LEMP, a citizen of the United States, and a resident of Lynn, in the county of Essex and State of Massachusetts, have invented certain new and useful Improvements in Forming or Shaping Metals by Electricity, of which the following is a specification.

My invention relates to the art of forming or shaping metals by dies, swages, or forming devices adapted to give the desired shape or impression to the metal.

The object of my invention is to afford a simple and expeditious process of forming or shaping metals, and involves in part the use of electric current of large volume or heating effect as the heating agent.

My invention consists, essentially, in putting the metal into an electric circuit between two clamps, holders, or abutments adapted to be moved toward one another, passing a heating-current from one holder or abutment to the other through the piece until the piece attains the desired plasticity, interposing the die or forming device between the holders and in abutment with the heated metal, and then applying suitable force to move one or both holders and squeeze the die or former and the heated metal together.

My invention consists, further, in certain variations of the process hereinafter described, whereby two pieces of metal may be formed or shaped simultaneously.

In carrying out the invention I may use any source of heating electric current, but for convenience employ any proper construction of transformer having a low-resistance secondary, consisting of a bar of copper, upon the terminals of which the clamps, holders, or abutments are mounted. Apparatus constructed properly for electric welding will serve the purposes of my invention.

The clamps, holders, or abutments employed in carrying out my invention may be one or both movable, and either or both of them may be provided with clamps, or in certain variations of the invention one only may have a clamp. It will suffice also to move either the holder in which the metal bar is clamped or the opposite abutment or electrode between which and the clamping device the current is passed so as to include the work.

In the accompanying drawings I have shown in Figure 1, in side elevation, a form of welding apparatus suitable for carrying out my invention. Figs. 2 and 3 illustrate the condition of the work at a certain stage of the process when two pieces of metal are to have their ends shaped or formed at the same time. Fig. 4 shows in enlarged view a kind of shaping or forming device adapted to give a conoidal shape to the metal operated upon. Fig. 5 shows a side view and the two ends, respectively, of a die adapted for use in making stamps according to my invention. Fig. 6 shows the end of a wrench which may be formed by my invention. Figs. 7, 8, and 9 illustrate the three several stages of the process as applied to forming two pieces simultaneously. Figs. 10 and 11 illustrate variations of the process. Fig. 12 shows another variation of the process.

Referring to Fig. 1, M indicates the secondary bar or conductor of a transformer, the primary of which (indicated at P) consists of a coil of insulated wire wound in a groove in the secondary bar M.

On the separated ends of the secondary bar M are mounted the clamps, holders, or abutments E E, between which the current flows for the purpose of heating the work. One or both of said clamps or holders are made movable, and each may have a clamping device, or one only may be provided with a clamping device. For the purpose of moving them any mechanical device may be employed. In the present instance I have shown one of them as actuated by means of a piston-rod R, secured to a piston working in a cylinder C. The pressure of any suitable fluid is applied at opposite ends of the cylinder through pipes controlled by a four-way valve, the handle of which is indicated at L.

S is the inlet-pipe leading to said valve, and D the exit or outlet. In one position of the handle communication is opened between the inlet S and one end of the cylinder and between the outlet D and the opposite end, so as to move the clamp, holder, or abutment toward the opposite one. In the reverse position of the handle the condition is reversed, the inlet S being connected with the proper end of the cylinder to produce a reverse movement and the outlet D with the opposite end. This mechanism is not herein more particularly described, as the details of its construction will be obvious to any mechanic, and it forms no part of my present invention, excepting in so far as it constitutes a part of a mechanism which may be used in practicing the art or improvement herein described and claimed.

This mechanism is not herein claimed, as it forms the subject of another application for patent filed by me June 25, 1890, Serial No. 356,632.

When employing the apparatus shown in Fig. 1 to carry out my invention, I proceed as follows: B is a bar or piece of metal which is to be manipulated in accordance with my invention. After clamping, the current is turned on until the portion of the metal between the clamps or abutments is heated and softened, when, through the application of suitable mechanical force tending to separate the clamps, the bar or rod may be divided into two pieces of the form such as shown in Fig. 2, or as shown in Fig. 3. It is preferable to stop the current just before the separation, thus leaving two pieces such as shown in Fig. 2. By separating the bar quickly the ends will be left as in Fig. 3. The two pieces with their ends in plastic condition having been thus formed, the double forming device or holder—such as shown in Fig. 4—is placed between the ends of the heated bars, and the lever L is turned into position so as to cause the clamps or holders to approach one another, thus pressing each hot end and the die or former together, so that the metal will assume the shape of the forming or swaging device. In this instance a conoidal form is given to the end of the bar. The forming or shaping device interposed between the two ends of the heated metal might be a die, as shown in Fig. 5, in which case each hot-metal piece would be made into a stamp.

Instead of using a single piece of metal B, two cold-metal pieces, as indicated in Fig. 10, may be placed in the electric circuit between the holders, clamps, or abutments, and made to bear against a piece of copper H, preferably of somewhat larger cross-section than the pieces of metal themselves, so that the current flowing from one clamp or abutment to the other will not heat the copper to any great extent, but will soften the ends of the bars in abutment therewith. After passing the current from one clamp to the other, so as to heat the bars to the desired plasticity, the piece H may be withdrawn and the die or former interposed, when pressure is applied to the holders or abutments, so as to force or squeeze the hot metal against the die or former. It is obviously not necessary that two pieces should be formed at the same time. One piece B, as indicated in Fig. 11, might be placed in one clamp and its end abutted against a larger piece, forming an opposite abutment. Current being passed from the abutment to the piece B, the end of the piece B will be heated and assume the desired plasticity, after which the abutment or the clamps for piece B, either or both, may be drawn apart to allow the insertion of the former against the hot metal, after which the movement of either the part holding the abutment or the part holding the piece B may be produced, so as to shape the metal as before described. It is also obvious that instead of separating or dividing a metal bar B, as described, two metal bars might be placed in the clamps or holders, as indicated in Fig. 12, with their ends in abutment and current passed from one clamp or holder to the other, so as to heat the abutted ends of the bars B B to the desired plasticity, after which one or both clamps may be moved so as to separate the pieces and allow the application of the proper pressure or force.

The production of a tool such as indicated in Fig. 6 by the process hereinbefore described is obvious, it only being necessary in such case to use a die or former which shall impress or shape the metal into the form indicated after the heating of the blank in the clamps or holders, as before described. It will be obvious that by this method of procedure metal may be shaped with great expedition, as no time is lost in the removal of the metal from the clamps or holders of the electric-heating apparatus.

What I claim as my invention is—

1. The herein-described improvement in forming or shaping metal, consisting in putting the metal into an electric circuit between two clamps, holders, or abutments adapted to be moved toward one another, passing a heating electric current from one holder or abutment to the other through the piece until the same attains the desired plasticity, interposing a die or forming device between the holders or clamps and in abutment with the heated metal, and then applying suitable force to move one or both holders or clamps and squeeze the die or forming device and the heated metal together.

2. The herein-described improvement in forming or shaping metal, which consists in placing a piece of metal between two clamps or holders, passing a current from one clamp or holder through the metal, so as to heat the same, separating the heated metal into two pieces, interposing a former or shaping device between the heated-metal ends, and then forcing the clamps or holders with the metal in place toward one another, as and for the purpose described.

3. The herein-described improvement in shaping or forming metal, consisting in clamping a piece of metal in a suitable clamp or holder forming one terminal of an electric metal-working apparatus, passing the heating-current through such metal piece until heated to the desired plasticity, retracting the movable clamp or holder with the metal in place, interposing a die or former, and then reversing the movement of the clamp or holder and heated-metal piece, so as to squeeze the same against the die or forming-surfaces.

4. The herein-described improvement in forming or shaping metal, which consists in heating the piece of metal by including it in an electric circuit between two clamps, holders, or abutments, then interposing a die or former in line with the heated metal and between the two clamps, holders, or abutments, and finally applying suitable force or pressure which will tend to force the heated metal and the die together.

Signed at Lynn, in the county of Essex and State of Massachusetts, this 29th day of March, A. D. 1890.

HERMANN LEMP.

Witnesses:
H. J. WIGHTMAN,
JOHN TREGONING.